US007176849B1

(12) United States Patent
Mooney et al.

(10) Patent No.: US 7,176,849 B1
(45) Date of Patent: Feb. 13, 2007

(54) WIRELESS SECURITY BADGE

(75) Inventors: Philip D. Mooney, Sellersville, PA (US); Jian Wu, San Diego, CA (US)

(73) Assignee: Agere Systems Inc., Allentown, PA (US)

( * ) Notice: Subject to any disclaimer, the term of this patent is extended or adjusted under 35 U.S.C. 154(b) by 526 days.

(21) Appl. No.: 09/638,388

(22) Filed: Aug. 15, 2000

(51) Int. Cl.
*G09G 5/00* (2006.01)
*G06Q 99/00* (2006.01)
*H05K 1/00* (2006.01)
*H04L 9/00* (2006.01)

(52) U.S. Cl. ........................................ 345/2.3; 713/173

(58) Field of Classification Search .................. 380/25; 345/98–100, 2.1, 2.3; 455/31.2; 343/760; 340/693.5; 705/64
See application file for complete search history.

(56) References Cited

U.S. PATENT DOCUMENTS 5,960,085 A * 9/1999 de la Huerga ............. 340/5.61
5,970,388 A * 10/1999 Will .......................... 455/31.2
5,986,562 A * 11/1999 Nikolich .................. 340/693.5
6,127,917 A * 10/2000 Tuttle ........................ 340/10.1
6,246,376 B1 * 6/2001 Bork et al. ................. 343/760
7,028,012 B2 * 4/2006 St. Vrain ..................... 705/64

FOREIGN PATENT DOCUMENTS

GB 2319747 A * 6/1998

* cited by examiner

*Primary Examiner*—Sumati Lefkowitz
*Assistant Examiner*—Srilakshmi K Kumar

(57) ABSTRACT

An apparatus and technique for allowing wireless electronic badges to temporarily establish a wireless network (e.g., a piconet network) with a network security station mounted in a facility of an employer, a gym, a membership club, etc. The wireless electronic badges automatically exchange user code with the network security station, and receives relevant badge information for display and use by that particular secured facility. In a preferred embodiment, BLUETOOTH technology is used in the wireless piconet front ends of the electronic wireless badge and the network security station. The disclosed electronic wireless badge includes an LCD display, a display controller, an information exchange module, and a wireless front end (e.g., a wireless piconet network such as a BLUETOOTH network). The electronic wireless badge includes a unique user code which is passed to the network security station. The network security station includes a complementary wireless front end, together with a database of user codes and badge display information for the properly authorized user codes. As an individual enters an area requiring identification, their electronic wireless badge exchanges a security code with the network security station, and upon proper authorization receives from the network security station appropriate badge display information for display. Exemplary display information may include, e.g., a photo of the authorized user corresponding to the authorization code in the electronic wireless badge, a name of the authorized user, an identification number, a company for which the displayed badge information relates, a membership type, a security level, etc.

11 Claims, 4 Drawing Sheets

WIRELESS SECURITY BADGE

BACKGROUND OF THE INVENTION

1. Field of the Invention

This invention relates generally to electronic security badges. More particularly, it relates to an apparatus and technique for implementing multiple security badges within a single electronic display badge device.

2. Background of Related Art

Display badges are used for multiple purposes. Most notably, display badges are used for security and identification purposes, e.g., to limit access to company buildings, to identify a person with a relevant identification number, etc. However, typical picture badges are susceptible to copying (i.e., forgery), making their use as a security device somewhat risky, particularly in high security applications.

Moreover, individuals may be required to display several different badges for entry and/or access to respective different places. For instance, a first badge may be required to be displayed while the individual is at work. Another badge may be required to be displayed to gain entry into a sports gym either during or after work hours. Yet another badge may be required to authorize entry into a wholesale shopping club.

Each badge worn by a user typically looks different, and/or displays different information on them, making their separate use necessary. Thus, a typical person may be required to carry several different badges at a time, switching between required badges as they move about in their daily activities (e.g., from work, to shopping, etc.) Oftentimes, a user may forget a particular one of many badges, requiring a return trip to home or the office to retrieve the necessary badge.

Accordingly, there is a need for streamlining the badges for a typical person to make it simpler to carry and remember required security badges. Moreover, there is a need for a display badge which prevents fraud and is generally more secure.

SUMMARY OF THE INVENTION

In accordance with the principles of the present invention, an electronic wireless badge device comprises a wireless front end, and an electronic display adapted to electronically display any of a multiplicity of possible badge information received by the wireless front end.

A network security station in accordance with another aspect of the present invention comprises a database of authorized user codes. A database of badge information corresponds to the authorized user codes. A wireless front end transmits badge information retrieved from the database of badge information.

A method of providing electronic badge information for display on a user's electronic wireless badge in accordance with yet another aspect of the present invention comprises establishing a wireless network between a network security station and a plurality of electronic wireless badges. Badge display information is transmitted to each of the plurality of electronic wireless badges. The badge display information is electronically displayed on each of the plurality of electronic wireless badges.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides an apparatus and technique for allowing an electronic wireless badge to temporarily establish a wireless network with a fixed wireless piconet transceiver mounted in a facility of an employer, a gym, a membership club, etc., and to display information relevant to that particular secured facility.

Figure 1:
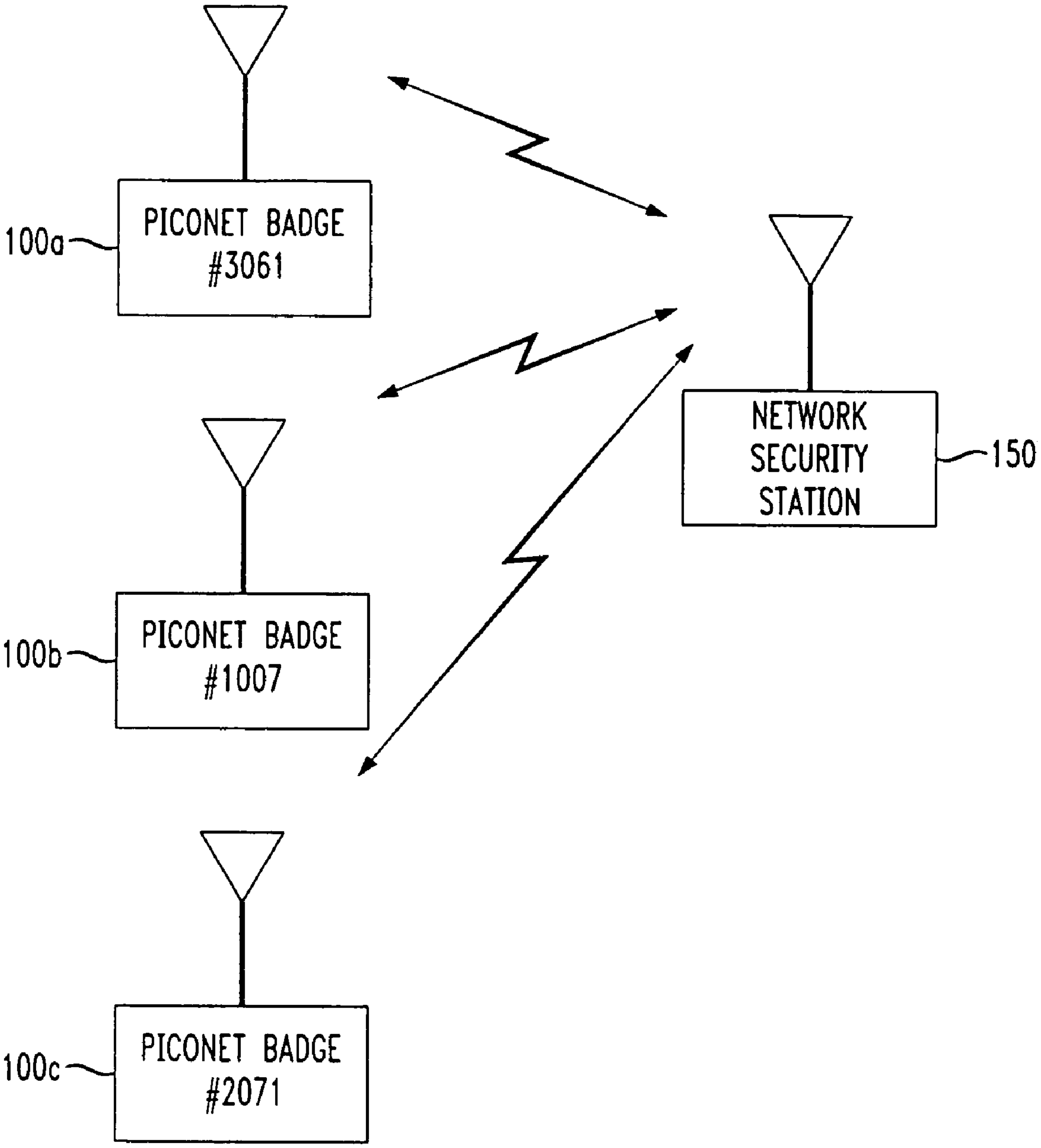
FIG. 1 is a block diagram of a plurality of electronic wireless badges established in a wireless network (e.g., piconet such as BLUETOOTH) and communicating with a network security station, in accordance with the principles of the present invention.

FIG. 1 is a block diagram of a plurality of electronic wireless badges established in a wireless network (e.g. a piconet network such as a BLUETOOTH network) and communicating with a network security station, in accordance with the principles of the present invention.

In particular, as shown in FIG. 1, a plurality of electronic wireless badges 100*a*–100*c* join a wireless network (e.g., a piconet) hosted by a network security station 150. Each electronic wireless badge 100*a*–100*c* establishes a presence on the wireless piconet network. This adds the electronic wireless badges 100*a*–100*c* as members of the secured facility's piconet network, and allows the electronic wireless badges 100*a*–100*c* to exchange electronic information with any device on the piconet network, most notably the network security station 150.

The establishment of the piconet connection and exchange of electronic information may take place at any time after the electronic wireless badge 100 comes within range of the access piconet device (e.g., the network security station 150), or within range of another badge that is in turn within range of the access piconet device.

The disclosed apparatus is wireless, and is preferably very short range radio frequency (RF). For example, the wireless frequency may be 2.4 GHz as per BLUETOOTH standards, and/or having a 20 to 100 foot range. The RF transmitter may operate in common frequencies which do not necessarily require a license from the regulating government authorities, e.g., the Federal Communications Commission (FCC) in the United States. Alternatively, the wireless communication can be accomplished with infrared (IR)

transmitters and receivers, but this is less preferable because of the directional and visual problems often associated with IR systems. Moreover, other suitable wireless protocols and technologies may be implemented to accomplish the wireless link. For instance, BLUETOOTH network technology may be utilized to implement a wireless piconet network connection (including scatternet). The Bluetooth standard for wireless piconet networks is well known, and is available from many sources, e.g., from the web site www.bluetooth.com.

In accordance with the principles of the present invention, a fixed wireless piconet transceiver (e.g., the network security station 150) is mounted in the secured facility. Each appropriately equipped facility includes its own network security station 150. If RF, the wireless transceiver may utilize half-duplex type communications with the fixed wireless piconet device (e.g., a network security station). Although half-duplex communications are suitable in most applications to transfer a low volume of electronic information, full-duplex communications are also possible and within the principles of the present invention. For example, BLUETOOTH time division multiplex (TDD) mode is capable of providing full duplex communications.

While the disclosed embodiments relate to piconet networks, and particularly to BLUETOOTH piconet networks, the principles of the present invention relate to wireless networks other than just piconet networks. For instance, the principles of the present invention relate equally to wireless RF links established between electronic wireless badges and network security stations. As another example, frequency modulation FM techniques may be used.

In the example of a BLUETOOTH piconet, the current standards permit one (1) master and seven (7) slaves to be active in the piconet at any one time. In accordance with the principles of the present invention, after an electronic wireless badge enters the piconet wireless network as a slave and communicates with an appropriate master network security station, that electronic wireless badge may then be placed into a ‘park’ mode. In this way, many more than seven (7) electronic badges may be utilized at any one time. Of course, multiple access points (e.g., network security stations) will also permit an increase in the number of electronic wireless badges which may be used in a particular system.

Figure 2:
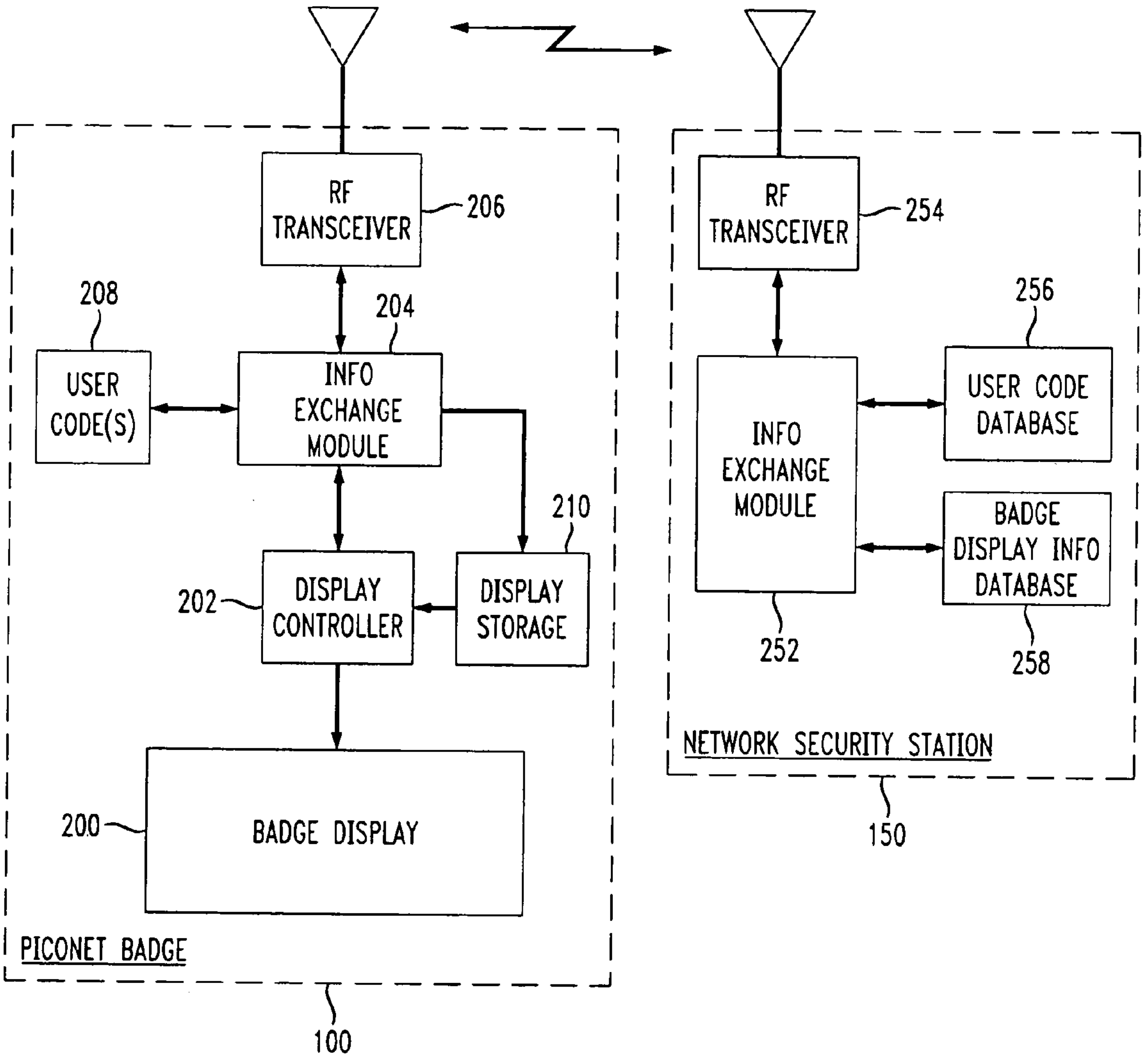
FIG. 2 is a detailed block diagram of an exemplary electronic wireless badge and an exemplary network security station, in accordance with the principles of the present invention.

FIG. 2 is a detailed block diagram of an exemplary electronic wireless badge and an exemplary network security station, in accordance with the principles of the present invention.

In particular, as shown in FIG. 2, the electronic wireless badge 100 is preferably a thin electronic display badge provided with a wireless piconet interface (e.g. a Bluetooth interface) 206, an information exchange module 204, a display controller 202, and a suitable display 200.

The wireless piconet interface 206 may be any suitable piconet front end (e.g., a BLUETOOTH front end). The wireless techniques may be radio frequency (RF) as shown in the disclosed embodiments. However, infrared (IR) communication techniques between electronic wireless badges and the piconet network (e.g., the network security station 150), while being somewhat more limited, are also within the scope of the present invention.

The information exchange module 204 may be any suitable processor, e.g., microprocessor, microcontroller, or digital signal processor (DSP). The information exchange module 204 is responsible for passing a badge ID or user code to the network exchange station 150, and for retrieving badge display information transmitted by the network exchange station 150 in response to the receipt of a properly authorized user code. Retrieved badge display information is passed to a display controller 202 suitable for controlling the selected badge display 200. The retrieved badge display information may also be stored in display storage memory 210, which may be non-volatile to allow presentation of badge information even after a power cycle of the electronic wireless badge 100.

The network security station 150 includes a piconet front end 254, an information exchange module 252, a user code database 256, and a badge display information database 258.

The piconet front end 254 is complementary to the piconet front ends 206 in each of the electronic wireless badges 100, and may use, e.g., BLUETOOTH technology.

The information exchange module 252 may be any suitable processor (e.g., microprocessor, microcontroller, or digital signal processor (DSP)) with applicable process software. The information exchange module 252 senses the presence of the electronic wireless badge 100, and receives a particular user code from the electronic wireless badge 100. In response, the information exchange module 252 searches through a suitable database (e.g., through user code database 256) to determine if the electronic wireless badge is recognized and authorized. If a match is found, the information exchange module 252 retrieves badge display information corresponding to the matched user code from a suitable badge display information database 258. The information exchange module 252 then passes the retrieved badge display information to the RF transceiver 254 for transmission to the relevant electronic wireless badge 100 using the established piconet.

The badge display 200 may be any suitable technology device, e.g., a graphical liquid crystal device (LCD) or other technology, e.g., a display produced on a thin sheet of plastic, capable of being viewed by an observer of the electronic wireless badge 100. Preferably, the badge display 200 is of suitably low weight and has extremely low power consumption requirements to serve as a portable device worn on the clothing or around the neck or arm of a user.

The electronic wireless badge 100 may be pre-programmed or pre-configured by a manufacturer of the electronic wireless badge 100. Alternatively, or additionally, the user code in each electronic wireless badge 100 may be changed or added to by an authorized network security administrator either by direct connection (e.g., serial connection) to the information exchange module 204, or through a password protected mechanism of communication from the network security station 150. An electronic wireless badge 100 may have more than one user code 208, e.g., one for each facility with which the electronic wireless badge 100 communicates.

As an individual enters an area requiring identification, an electronic wireless badge 100 in accordance with the principles of the present invention exchanges a security code with the network security station 150, and upon proper authorization receives from the network security station 150 appropriate badge display information for display on the badge display 200 of the electronic wireless badge 100.

Exemplary display information may include, e.g., a photo of the authorized user corresponding to the authorization code in the electronic wireless badge, a name of the authorized user, an identification number, a company for which the displayed badge information relates, a membership type, a security level, etc.

Figure 3A:
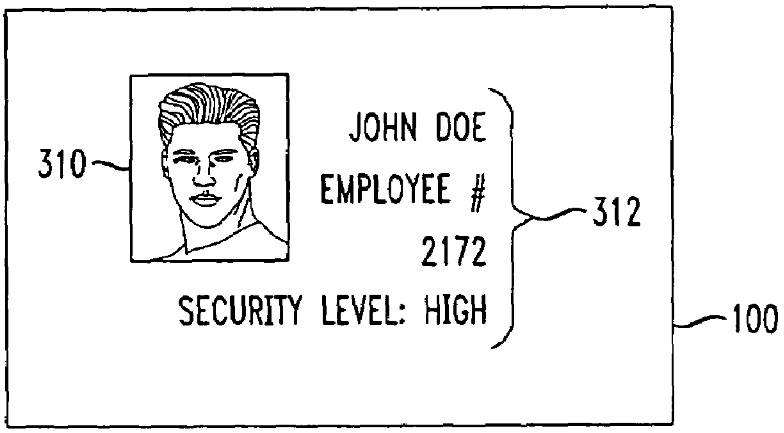
FIG. 3A shows an electronic wireless badge with exemplary displayed information corresponding to a particular facility (e.g., work), in accordance with the principles of the present invention.
Figure 3B:
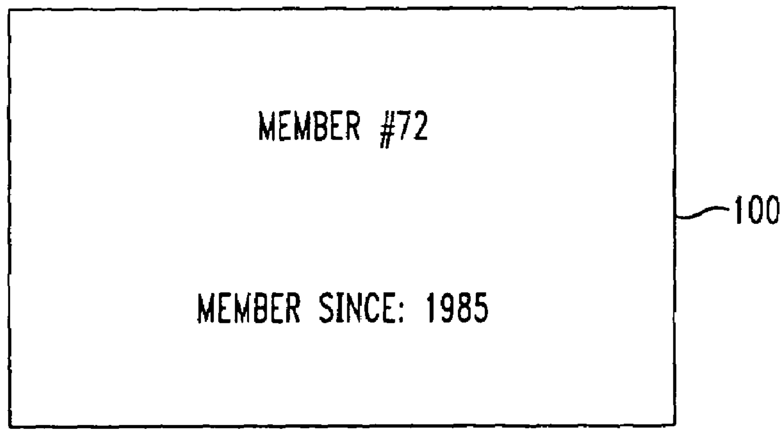
FIG. 3B shows an electronic wireless badge with exemplary displayed information corresponding to another particular facility (e.g., a wholesale club), in accordance with the principles of the present invention.

FIGS. 3A and 3B show exemplary badge display information as displayed on the badge display 200. For instance, FIG. 3A depicts a photo of an authorized wearer of the electronic wireless badge 100, together with desired information such as a name, employee number, and/or security level. FIG. 3B depicts a textual display only showing, e.g., a wholesale club member number and member since information.

The badge display information may be passed in any format. For instance, the badge display information may be passed as binary information, ASCII information, or other suitable format. Additionally, the badge display information may be passed in a particular file format, e.g., in JPEG, GIF, or other graphics file format. In any event, the information exchange module 204 in the electronic wireless badge 100 is equipped with a suitable application program capable of translating the received badge display information into a suitable format for passage to the display controller 202 and display on the badge display 200.

Figure 4:
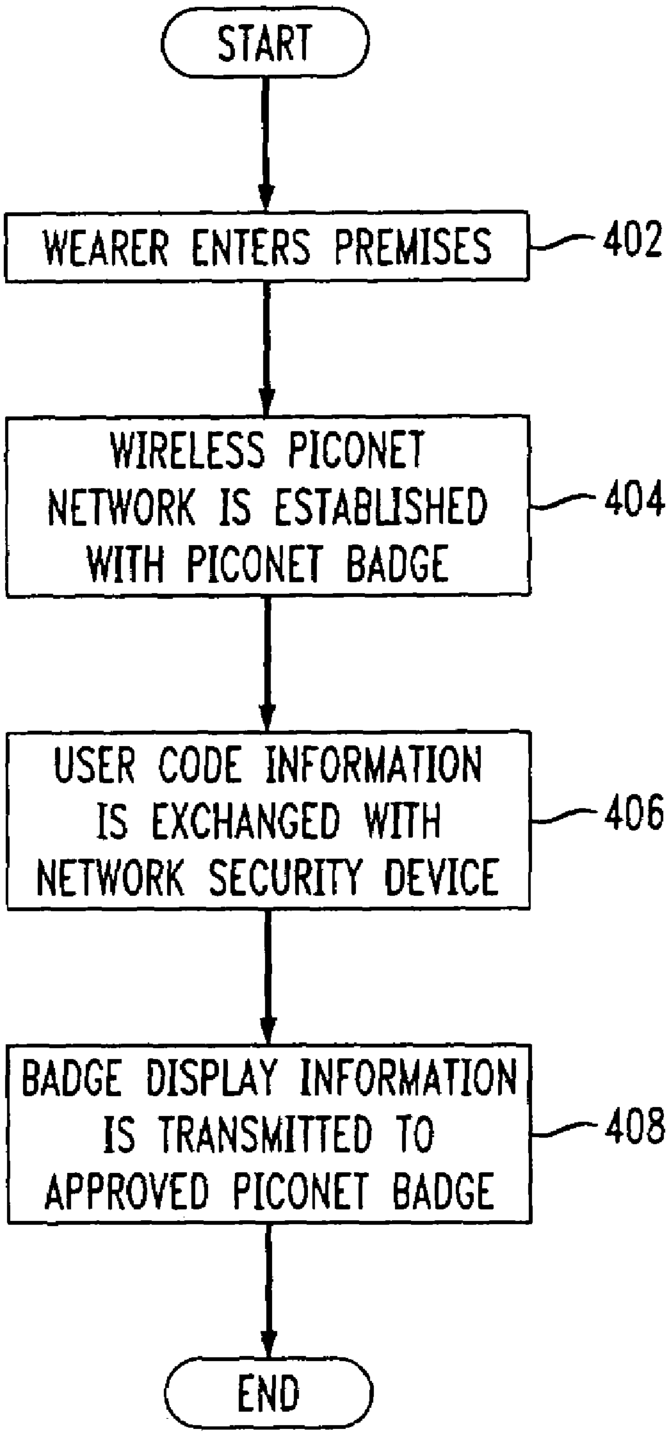
FIG. 4 is a flow chart illustrating an exemplary process by which information is exchanged between an electronic wireless badge and a network security station as shown in FIGS. 1 and 2, in accordance with the principles of the present invention.

FIG. 4 is a flow chart illustrating an exemplary process by which information is exchanged between an electronic wireless badge and a network security station as shown in FIGS. 1 and 2, in accordance with the principles of the present invention.

In particular, as shown in step 402 of FIG. 4, an electronic wireless badge wearer enters a particular facility or premises wearing an electronic wireless badge 100. When a wearer of the electronic wireless badge 100 in accordance with the principles of the present invention enters a particular area (e.g., work, gym, store, etc.), their electronic wireless badge 100 enters the network security piconet (e.g., BLUETOOTH network).

In step 404, a wireless piconet network is established between the electronic wireless badge 100 and a network security station 150. When the network security station 150 senses the presence within RF range of a particular electronic wireless badge 100, the network security station 150 announces itself to the electronic wireless badge 100. In response, the electronic wireless badge 100 transfers security code information to the network security station 150. The electronic wireless badge 100 may transfer security code information relating to any and all possible locations that the user might be entering.

Then, the network security station 150 searches through the received security code information to locate a relevant security code for that particular network security station 150. Alternatively, and preferably, the electronic wireless badge 100 will transfer security code information relating only to the announcing network security station 150.

In step 406, the network security station 150 senses the presence of the electronic wireless badge 100 and receives user code information from the electronic wireless badge 100. In response, the network security device 150 compares the received user code (or user codes) with entries in the user code database 256 (FIG. 2), and if a match is found, retrieves corresponding badge display information from the badge display information database 258.

In step 408, badge display information is transmitted to the properly authorized electronic wireless badge 100.

If the network security station 150 and the electronic wireless badge 100 are both configured to accept each other, the network security station 150 transfers display information to the electronic wireless badge 100, which then displays it. In this way, the electronic wireless badge 100 will display the proper and relevant ID information required by the premises upon which the wearer has entered.

The badge display information may continue to be displayed until the user leaves the premises and thus looses contact with the piconet. Alternatively, the badge display information may continue to be displayed until the electronic wireless badge 100 is turned off, or until the electronic wireless badge 100 establishes contact with a different piconet. As another alternative, the badge display information can be cleared (i.e., blanked) until manually or automatically queried by a security guard's verification device.

Badge display information can be based on successful access to a relevant piconet (i.e., being within range of the piconet RF signal). Alternatively, a global positioning system (GPS) or other locating device may be implemented in the electronic wireless badge 100 to provide absolute location information. Using a GPS, when the wearer exited the confines of a particular building or locale, the badge display information can be deleted or otherwise disabled. The feasibility of implementing a GPS within an electronic wireless badge 100 in accordance with the principles of the present invention depends upon a balance of size, cost, and/or power consumption with the needs of a particular application.

Preferably, the electronic wireless badge 100 is powered by a suitable power source. For instance, long life batteries (e.g., Lithium batteries) are preferred, but rechargeable batteries, and/or solar power is possible either instead of batteries or in addition to batteries as is somewhat common in some indoor calculators.

Non-volatile display storage 210 may be implemented in the electronic wireless badge 100 to store the graphical images currently displayed. In this way, an electronic wireless badge 100 may be powered down and up and it will continue to display the badge information which it was displaying before the power down. However, non-volatile display storage 210 may not be absolutely necessary in most applications because the electronic wireless badge 100 can re-establish contact with the relevant piconet and again request download of relevant display information when again powered up.

An electronic wireless badge 100 in accordance with the principles of the present invention can increase security by preventing fraudulent creation of counterfeit badges. For instance, fraudulent use of an electronic wireless badge 100 might be exposed by:

1) Periodically changing the format or information displayed by the electronic wireless badge 100 (e.g., every week, every day, every minute, etc.)

2) Flashing the badge display 200 randomly so that all properly authorized electronic wireless badges 100*a*–100*c* would flicker together (e.g., at the same time, together with visible light or icon, etc.) Thus, an electronic wireless badge 100 not accessible by the network security station 150 for fraud or other reasons would not flicker appropriately.

3) A mismatch between a wearer's face and a properly authorized user photo (e.g., 310 in FIG. 3A) obtained during a current piconet session from the network security station 150 and displayed at a stolen electronic wireless badge 100.

4) Display of improper validation or expiration of badge information (e.g., 312 in FIG. 3A) on the relevant electronic wireless badge 100 itself.

Moreover, since the electronic wireless badge 100 will be out of range of the piconet when a wearer leaves the company facilities, displayed badge information will be lost and not be seen by the general public or anyone outside the facilities, leaving outsiders without any knowledge of the particular information used for display by a particular facility, company, etc.

In accordance with the principles of the present invention, a same electronic wireless badge 100 can be used at multiple facilities, each without knowledge or interaction with the other. For instance, the electronic wireless badge 100 used for access at work can be used when entering the local subscription gym or wholesale club, even though totally different information and/or images may and will be displayed by the different facilities.

The electronic wireless badge 100 may link with a suitable piconet device (e.g., Bluetooth device) besides carrying identifying display information. For instance, while at the wholesale club, an electronic wireless badge 100 may exchange membership information, medical insurance information, auto club membership information, credit card information, etc. with the checkout register.

In an alternative embodiment, badge display information for a plurality of localities or uses can be stored locally, preferably in non-volatile storage memory 210.

The electronic wireless badge 100 may have a different security code for each different facility. In this case, the electronic wireless badge 100 may send a particular security code to the network security station 150 when initially establishing contact with the relevant piconet, e.g., based on a product ID or other code sent by the network security station 150. Alternatively, the electronic wireless badge 100 may utilize a common security code for all facilities.

In accordance with the principles of the present invention, display badge format information may be easily and automatically changed without requiring a user to change conventional paper badges when moving from one secured facility to the next (e.g., from work to the subscription gym). Moreover, security can be greatly increased and fraudulent badges prevented by periodically altering electronically displayed information. Forgery would be next to impossible, and only one electronic wireless badge 100 may be needed for use in multiple facilities.

While the invention has been described with reference to the exemplary embodiments thereof, those skilled in the art will be able to make various modifications to the described embodiments of the invention without departing from the true spirit and scope of the invention.

What is claimed is:

1. An electronic wireless badge device, comprising:

a wireless front end;

an information exchange module to wirelessly communicate a security code with a database through said wireless front end upon a user entering an area requiring authorization;

an electronic display adapted to electronically display a photograph on said electronic wireless badge device; and a receiver to receive said photograph for display on said electronic display from said database upon proper authorization of said security code and upon said user entering said area requiring authorization.

2. The electronic wireless badge device according to claim 1, wherein:

said electronic display is adapted to display any one of a plurality of different badge information at any one time.

3. The electronic wireless badge device according to claim 1, wherein:

said wireless front end is a wireless piconet front end.

4. The electronic wireless badge device according to claim 1, wherein:

said wireless piconet front end is a BLUETOOTH device.

5. The electronic wireless badge device according to claim 1, wherein:

said badge information includes a photo of an authorized wearer.

6. The electronic wireless badge device according to claim 1, wherein:

said electronic display is an LCD device.

7. The electronic wireless badge device according to claim 1, further comprising:

non-volatile display memory for storing badge information for display on said badge display.

8. A network security station, comprising:

a database of authorized user codes;

a database of user identification information corresponding to said authorized user codes; and a wireless front end adapted to transmit said user identification information of a wearer of an electronic wireless badge device retrieved from said database of user identification information to trigger an electronic display on said electronic wireless badge device to electronically display a photograph on said electronic wireless badge upon proper authorization of an authorization user code and upon a user entering an area requiring authorization.

9. The network security station according to claim 8, wherein:

said wireless front end is a wireless piconet front end.

10. The network security station according to claim 9, wherein:

said wireless piconet front end is a BLUETOOTH device.

11. The network security station according to claim 9, wherein:

said user identification information includes a photo of an authorized wearer.

* * * * *